April 12, 1960  R. L. TARRAN  2,932,499
SPEED INDICATING MEANS
Filed Oct. 7, 1955  2 Sheets-Sheet 1

ROBERT L. TARRAN.
INVENTOR.
BY E.C. McRae,
J.R. Faulkner,
J.H. Oster,
R.T. Seeger,
ATTYS April 12, 1960 R. L. TARRAN 2,932,499
SPEED INDICATING MEANS
Filed Oct. 7, 1955 2 Sheets-Sheet 2

ROBERT L. TARRAN.
INVENTOR.

BY E.C. McRae.
J.R. Faulkner.
J.H. Oster.
R.J. Seeger.
ATTYS.

United States Patent Office 2,932,499
Patented Apr. 12, 1960

2,932,499

SPEED INDICATING MEANS

Robert L. Tarran, Detroit, Mich., assignor to Ford Motor Company, Dearborn, Mich., a corporation of Delaware Application October 7, 1955, Serial No. 539,152

3 Claims. (Cl. 264—15)

This invention relates to speed indicating means and more particularly to motor vehicle speedometers.

In the past, due to the relative placement of the dashboard and steering equipment in automobiles and other motor vehicles, there has been difficulty for the operator of the motor vehicle to easily view the dials and gauges on the dashboard. The steering wheel and horn ring, for example, frequently obstruct the operator's view of the dashboard. It is desirable, therefore, that the indicating means on the dashboard be easily read, especially the speedometer.

It is an object of this invention to provide speedometer means that are easily read and accurately indicate the speed at which the automobile or motor vehicle is traveling.

It is a further object of this invention to provide an attractive, symmetrical speedometer for a motor vehicle.

It is another object of this invention to provide a speedometer that is light conducting in order that it may be read more easily.

A further object is to provide a speedometer that may be read from a relatively large number of angles and positions so that the operator need not take more than a glance to read his speed. Other objects and advantages of this invention will be made more apparent as this description proceeds, particularly when considered in connection with the accompanying drawings, wherein:

Figure 1 is a partial side elevational view of a preferred embodiment of this invention;

Figure 2 is a diagrammatic cross section taken at 2—2 of Figure 1;

Figure 5:
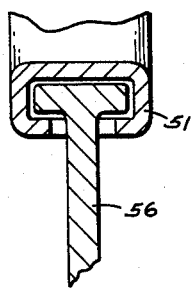
Figure 5 is a cross section taken at 5—5 of Figure 4.

In Figure 1 is seen a diagrammatic front view of a hemiglobular speedometer surface 21 with concentric rings which are marked in the desired units of speed. The distance between these rings should be in the amount necessary to properly indicate the speed that is associated with the positions of arms 24, 25. Surrounding surface 21 is frame 22 which protrudes from the dashboard whereon surface 21 is mounted, said dashboard not being shown, so that the speedometer is shaded and protected from reflections and glares making it easier to read. In Figure 2 is seen a diagrammatic cross section with arms 24, 25 in their extended position indicating approximately top speed. While there are two arms shown in this embodiment, it is within the scope of this invention to provide as many or as few arms as the situation might call for. In Figure 2, arms 24, 25, are pivoted at pivots 26, 27 to struts 28, 29. The other ends of struts 28, 29 are pivoted to member 30, which rides along axis 32. Axis 32 is maintained in relative placement to disk 21 by means of cylindrical housing 33. Axis 32 is rotated in proportion to the speed of the vehicle by suitable means such as is indicated by gear wheel 35, gear post 36, and pinion 37.

Post 36 is supported and maintained by cylinders 38, 39 which are fixed in relation to surface 21. As wheel 35 is turned, post 36 is caused to rotate, turning axis 32. Arms 24, 25 are pivoted to member 40, which is fixed to and rotates with axis 32. As axis 32 rotates, arms 24, 25 are thrown out and away from axis 32 due to centrifugal force. The ends of arms 24, 25 may be weighted so that the desired rate of movement toward and away from the axis is obtained. Spring 42 is placed about the axis and between members 30 and 40. The resilience of this spring may also be varied to obtain the desired characteristics of movement of arms 24, 25. Spring 42 is in compression and urges member 30 to its most extended position at which time the arms are approximately parallel. In this position, the arms indicate a speed of zero and it is not until shaft 32 is rotated that a speed is indicated.

Surface 21 is made of a transparent material so that the position of weighted ends 44, 45 may be seen. Ends 44, 45 may be of a bright or irradiant material so that their position may more easily be seen. In addition, arms 24, 25 may be of a light-conducting material such as "Plexiglas" or "Lewisite," which is a polymer of methyl methacrylate. The ends of the arms that are pivoted to member 40 may be introduced to a light source 47 which may be placed near axis 32 and the light will be conducted to the ends 44, 45 where it may be made to cause the ends to glow and be easier to locate. The nature and kind of light source, of course, may be varied to suit individual needs.

With this speed indicating means, the speed is read through the surface 21 and is indicated by the continuous circle described by ends 44, 45. The smaller this circle becomes, the lower the speed; and the larger, the greater the speed. Since the speed is indicated by this circle, regardless of where on calibrated disk 21 the operator looks he can immediately know his speed as the circle appears continuous. This is an advantage over the present day speed indicating means which may be blocked out from the operator's view by the steering wheel, horn ring, or some other obstruction. The more time that the operator's eyes are away from the road, the greater the opportunity for a driving mishap.

Figure 3:
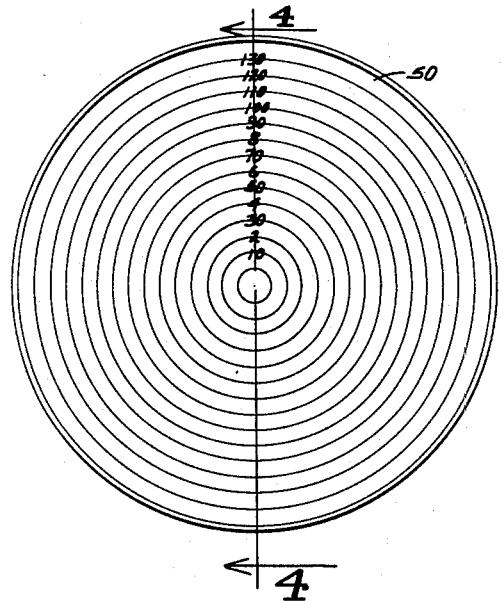
Figure 3 is a front elevational view of another embodiment of this invention.
Figure 4:
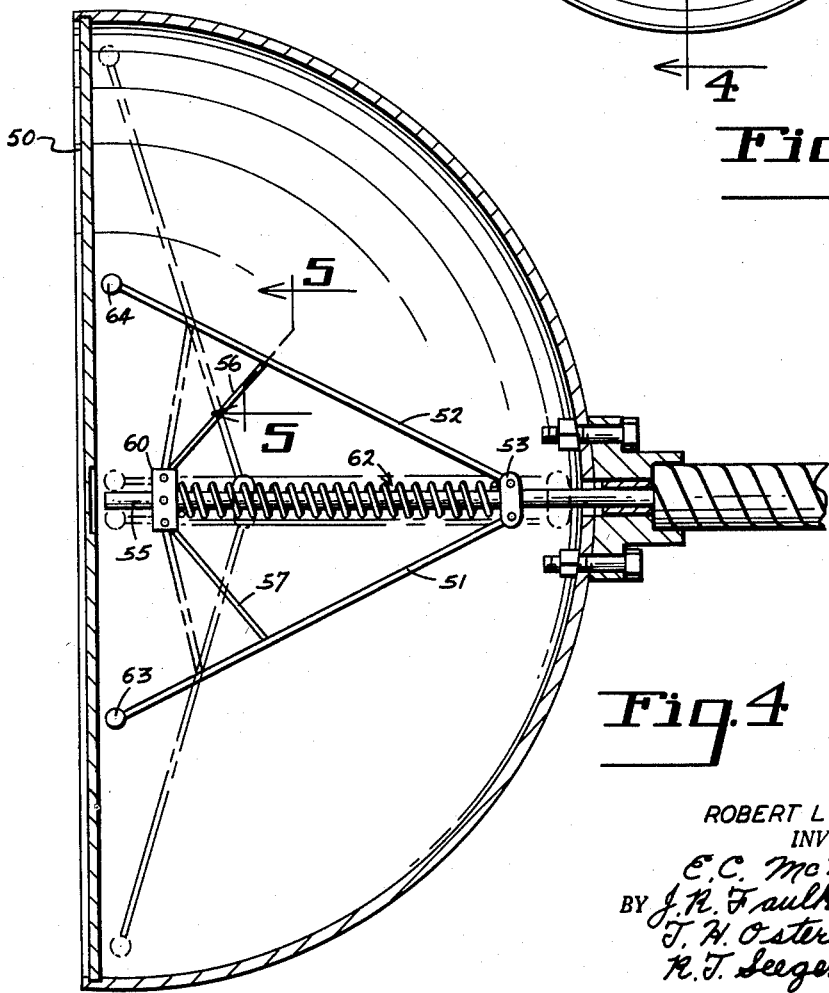
Figure 4 is a diagrammatic section taken at 4—4 of Figure 3.

Figures 3, 4, and 5 show another embodiment in diagrammatic form of this invention. In Figure 3 is a front view of disk 50 which serves the purpose of surface 21, but in this embodiment is substantially flat. Disk 50 has concentric circles which are numbered in the desired units of speed. The distance between these circles should be in the amount necessary for proper speed indication. In Figure 4 is shown a diagrammatic view of the internal structure of this embodiment. Arms 51, 52 are pivoted to member 53 which rides along axis 55. Struts 56, 57 are pivoted at one of their ends to member 60 which is fixed to and rotates with axis 55. The other end of members 56, 57 are attached to arms 51, 52 in the manner shown in Figure 5. The ends of the struts are T-shaped and they move in rectangular grooves which are in arms 51, 52. Spring 62 is placed about axis 55 between members 60 and 53 causing the arms 51, 52 to assume a parallel position when the axis 55 is not rotating. Axis 55 is caused to rotate in proportion to the vehicle speed by means which are not shown but well known in the art today. As axis 55 is caused to rotate, member 60 in turn is rotated, causing arms 51, 52 with ends 63, 64 which may be weighted to separate. The dimensions and properties of arms 51, 52 and their end portions and spring 62 may be varied to get desired movement as axis 55 is rotated. Surfaces 21, 50 may be calibrated so that positions of ends 63, 64 and 44, 45 will indicate the desired speeds.

This and any other embodiment may also have light-conducting material in arms 51, 52 and glowing or irradiant material in ends 63, 64.

It will be understood that the invention is not to be limited to the exact construction shown and described, but that various changes and modifications may be made without departing from the spirit and scope of the invention, as defined in the appended claims.

What is claimed is:

1. Speed indicating means comprising an axial shaft, a pair of arms rotatably mounted about said shaft, said arms at one of their ends being pivoted to a mounting on said shaft, and the other of their ends being weighted, said arms being guided by and attached through struts to a shaft riding member, spring means encircling said shaft and being between said mounting and said shaft riding member, rotating means for revolving said shaft and hence said arms in proportion to the speed to be measured, a hemispherical calibrated member enclosing said axial shaft and having the axis of calibrations coincident with the axis of the axial shaft that speed is indicated by the position of said weighted ends along said calibrated member.

2. The speed indicating means claimed in claim 1 with said calibrated member being transparent so that the weighted ends of said arms may be viewed from without said member, light means, said light means placed adjacent to said mounting on said shaft, said arms being composed of light conducting material, said weighted ends of said arms composed of an irradiant material.

3. In a centrifugal fly-ball speed indicating device wherein weights are rotatably carried on pivoted arms, that improvement comprising a transparent window disposed in front and adjacent said weights through which said weights may be viewed, said window having radially spaced speed calibrations arranged about an axis substantially coincidental to the axis of the pivoted arms, said weights and arms formed of light-transmitting plastic, a source of light arranged to transmit light into said arms and through said arms to said weights.

References Cited in the file of this patent

UNITED STATES PATENTS

| | | |
|---|---|---|
| Re. 1,285 | Miller | Mar. 4, 1862 |
| 949,990 | Steinmeyer | Feb. 22, 1910 |
| 1,091,059 | Gore | Mar. 24, 1914 |
| 1,244,162 | Asplund | Oct. 23, 1917 |
| 1,272,396 | Dixon et al. | July 16, 1918 |
| 1,491,347 | Goldman | Apr. 22, 1924 |
| 2,124,089 | Stuerzl | July 19, 1938 |
| 2,286,737 | Hills | June 16, 1942 |
| 2,551,717 | Anderson | May 8, 1951 |

FOREIGN PATENTS

| | | |
|---|---|---|
| 719,762 | France | Feb. 10, 1932 |
| 183,735 | Germany | Apr. 16, 1907 |
| 1,501 | Great Britain | Jan. 19, 1906 |